(12) United States Patent
Thackeray et al.

(10) Patent No.: US 6,730,429 B2
(45) Date of Patent: May 4, 2004

(54) INTERMETALLIC NEGATIVE ELECTRODES FOR NON-AQUEOUS LITHIUM CELLS AND BATTERIES

(75) Inventors: Michael M. Thackeray, Naperville, IL (US); John T. Vaughey, Elmhurst, IL (US); Christopher S. Johnson, Naperville, IL (US); Linda M. L. Fransson, Uppsala (SE); Ester Kristina Edstrom, Vange (SE); Gary Henriksen, Downers Grove, IL (US)

(73) Assignee: The University of Chicago, Chicago, IL (US)

( * ) Notice: Subject to any disclaimer, the term of this patent is extended or adjusted under 35 U.S.C. 154(b) by 285 days.

(21) Appl. No.: 10/008,885

(22) Filed: Nov. 8, 2001

(65) Prior Publication Data

US 2002/064704 A1 May 30, 2002

Related U.S. Application Data

(60) Provisional application No. 60/247,404, filed on Nov. 10, 2000.

(51) Int. Cl.[7] .............................. H01M 4/38; H01M 4/40
(52) U.S. Cl. ..................... 429/50; 429/220; 429/231.95
(58) Field of Search ................................ 429/50, 218.1, 429/220, 231.95

(56) References Cited

U.S. PATENT DOCUMENTS 5,770,333 A * 6/1998 Saito et al. ................. 429/326
6,203,944 B1 * 3/2001 Turner et al. ............. 429/218.1
6,528,208 B1 * 3/2003 Thackeray et al. ....... 429/218.1
2002/0064704 A1 * 5/2002 Thackeray et al. ........... 429/50
2002/0136953 A1 * 9/2002 Vaughey et al. ......... 429/218.1

FOREIGN PATENT DOCUMENTS

WO          WO 00/03443       * 1/2000 ............ H01M/4/58

OTHER PUBLICATIONS

NiAs–versus zinc–blende–type intermetallic insertion electrodes for lithium batteries: lithium extraction from $Li_2CuSn$; J.T. Vaughey, et al.; Electrochemistry Communications 1 (1999) 517–521.

(List continued on next page.)

Primary Examiner—Mark Ruthkosky
(74) Attorney, Agent, or Firm—Emrich and Dithmar

(57) ABSTRACT

A method of operating an electrochemical cell is disclosed. The cell has an intermetallic negative electrode of $Cu_{6-x}M_xSn_5$, wherein x is $\leq 3$ and M is one or more metals including Si and a positive electrode containing Li in which Li is shuttled between the positive electrode and the negative electrode during charge and discharge to form a lithiated intermetallic negative electrode during charge. The voltage of the electrochemical cell is controlled during the charge portion of the charge-discharge cycles so that the potential of the lithiated intermetallic negative electrode in the fully charged electrochemical cell is less than 0.2 V but greater than 0 V versus metallic lithium.

20 Claims, 15 Drawing Sheets

The $Cu_6Sn_5$ to $Li_2CuSn$ Transformation

● - Copper
○ - Tin
● - Lithium

OTHER PUBLICATIONS

Intermetallic insertion electrodes derived from NiAs–, Ni$_2$In–, and Li$_2$CuSn–type structures for lithium–ion batteries; M.M. Thackeray, et al.; Electrochemistry Communications 1 (1999) 111–115.

*In Situ* X–Ray Study of the Electrochemical Reaction of Li with η'—Cu$_6$Sn$_5$; D. Larcher, et al.; Journal of The Electrochemical Society, 147 (5) (2000) 1658–1662.

Li$_x$Cu$_6$Sn$_5$ (0<x<13) : An Intermetallic Insertion Electrode for Rechargeable Lithium Batteries; Keith D. Kepler, et al; Electro–chemical and Solid–State Letters, 2 (7) (1999) 307–309.

Intermetallic Insertion Electrodes for Lithium Batteries; J. T. Vaughey, et al.; Electrochemical Society Proceedings, vol. 99–24 280–289.

Copper–tin anodes for rechargeable lithium batteries: an example of the matrix effect in an intermetallic system; K.D. Kepler, et al.; Journal of Power Sources 81–82 (1999) 383–387.

Lithium storage properties of nanocrystalline eta–Cu$_6$ Sn$_5$ alloys prepared by ball–milling; G.X. Wang, et al.; Journal of Alloys and Compounds 299 (2000) L12–L15.

Science and Applications of Mixed Conductors for Lithium Batteries; Michael M. Thackeray, et al., MRS Bulletin, Mar. 2000, 39–46.

* cited by examiner

INTERMETALLIC NEGATIVE ELECTRODES FOR NON-AQUEOUS LITHIUM CELLS AND BATTERIES

RELATED APPLICATIONS

This application, pursuant to 37 C.F.R. 1.78(c), claims priority based on provisional application Ser. No. 60/247,404 filed on Nov. 10, 2000.

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

FIELD OF THE INVENTION

This invention relates to methods of operating intermetallic negative electrodes for non-aqueous lithium cells and batteries. More specifically, it relates to methods of operating modified compositions of copper-tin electrodes, $Cu_{6-x}M_xSn_5$, wherein $x \leq 3$ and in which M is one or more metals including silicon, and to methods using current collectors and grain growth inhibitors when used with such electrodes, and to controlled operating conditions for the lithium cells and batteries using such intermetallic electrodes. Preferred compositions useful in the inventive methods include $Cu_{6-x}M_xSn_5$ electrodes in which the copper atoms are partially replaced by one or more transition metals and lithium in partial replacement M and Li or one or more of M including Li. Improved electrochemical performance with respect to delivered capacity and cycling stability of the lithium cells over those known in the art is obtained by controlling the structure of the lithiated $Cu_{6-x}M_xSn_5$ electrodes and by controlling the voltage of the lithium cell such that the potential of the lithiated intermetallic negative electrode at the top of charge is less than 0.2 V but greater than 0 V vs. metallic lithium.

A significant problem in the field is that copper-tin electrodes, notably $Cu_6Sn_5$, lose capacity if cycled repeatedly to 0 V vs. metallic lithium. When cycled to 200 mV vs. lithium, the capacity retention is improved significantly, but at the expense of the delivered amount of capacity.

SUMMARY OF THE INVENTION

The invention relates to a method of using intermetallic negative electrodes based on copper-tin, $Cu_6Sn_5$, for non-aqueous electrochemical lithium cells and batteries. The invention relates more specifically to the use of modified electrode compositions, $Cu_{6-x}M_xSn_5$, wherein $x \leq 3$ and where M is one or more metals used in the inventive method, preferably a first row transition metal and lithium, that when cycled in an electrochemical cell the voltage of cell is controlled such that the potential of the lithiated intermetallic negative electrode at the top of charge is less than 0.2 V but greater than 0 V vs. metallic lithium. The $Cu_{6-x}M_xSn_5$ electrodes optionally contain additional M metal (or metals) in the electrode either in finely divided, dispersed and intimately mixed form or as a substrate to act as current collector. The electrodes may also contain additional components to control porosity and current collection or to suppress grain growth in the electrode during electrochemical operation. Such modifications to the composition of copper-tin electrodes and to the regulation of the operating conditions of the cells improve the capacity and cycle life of lithium cells and batteries. The superior electrochemical performance is achieved by controlling the structure of the lithiated $Cu_{6-x}M_xSn_5$ electrodes, either electronically by controlling the voltage of the lithium cell, or by limiting the installed capacity in the positive electrode.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE PREFERRED EMBODIMENTS

The present invention relates to modified copper-tin electrodes of general formula $Cu_{6-x}M_xSn_5$ that are of interest as the negative electrodes for non-aqueous electrochemical lithium cells and batteries. State-of-the-art lithium-ion cells use a lithiated graphite negative electrode, coupled to a lithium transition metal oxide positive electrode, commonly $LiCoO_2$, via an electrolyte that consists of a lithium salt such as $LiPF_6$, dissolved in an organic solvent such as a 50:50 mix of dimethyl carbonate (DMC) and diethyl carbonate (DEC). The electrochemical discharge and charge reaction occurs by a process by which lithium ions are shuttled between the two host electrodes with concomitant reduction and oxidation taking place at the electrodes. The ideal reaction is represented:

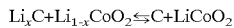
$$Li_xC+Li_{1-x}CoO_2 \leftrightharpoons C+LiCoO_2$$

The lithiated graphite electrode operates close to the potential of metallic lithium, which raises problems with respect to the reactivity of this electrode with flammable organic-based electrolytes and the consequent safety of lithium-ion cells. There are therefore important reasons to develop safer negative electrodes for such cells and batteries, and particularly electrodes that operate a few hundred millivolts above the potential of metallic lithium.

Figure 1:
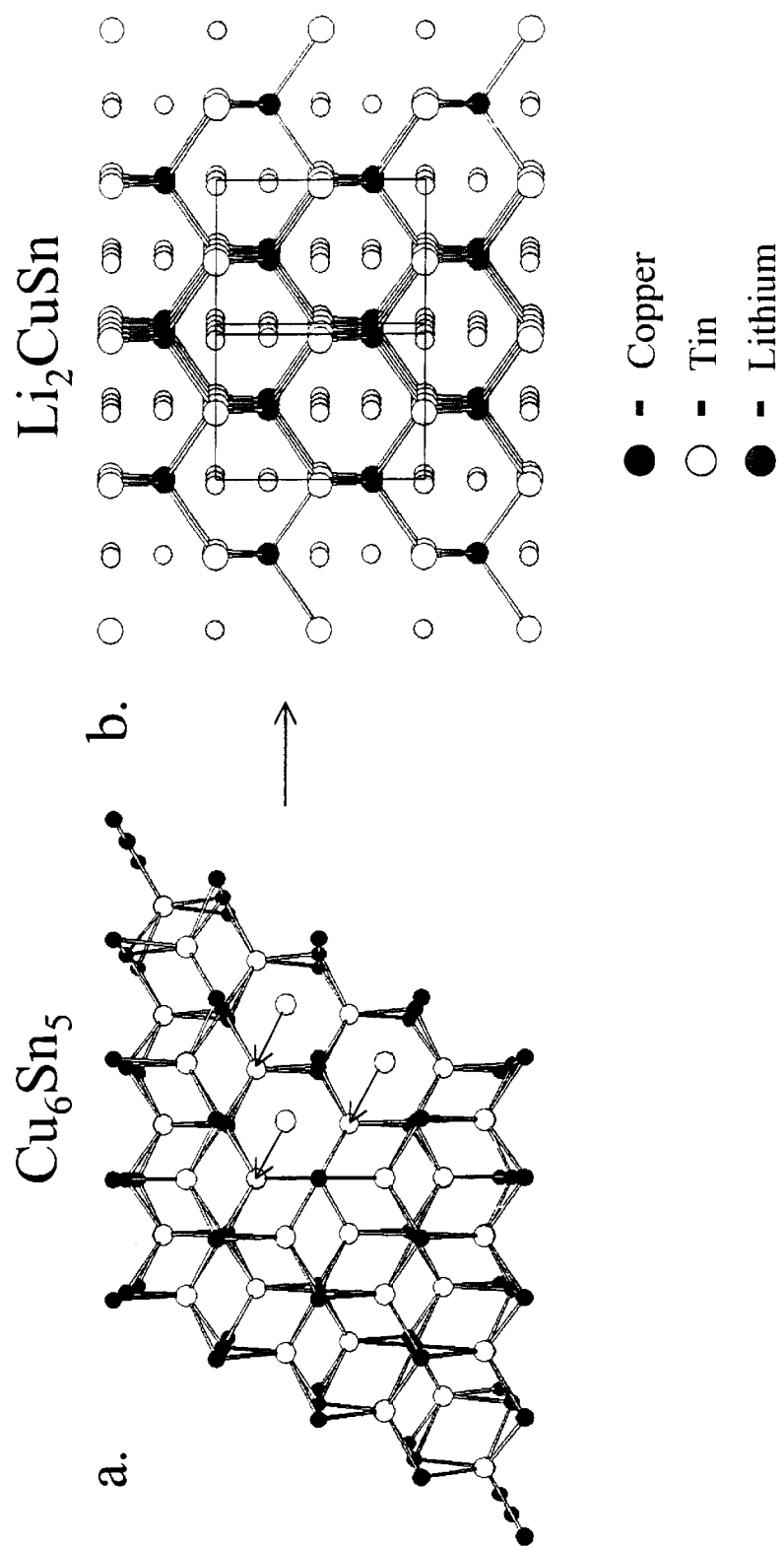
FIGS. 1(a) and (b) depict a schematic idealized representation of a) $Cu_6Sn_5$ with a NiAs-type structure and its transformation on reaction with lithium to b) $Li_2CuSn$ with a lithiated zinc-blende-type structure, in which the CuSn component adopts the Zn and S atomic positions of the mineral zinc-blende, ZnS. The Cu atoms in the interstitial sites of the NiAs-type structure in a) have not been shown for clarity; these interstitial Cu atoms impart some $Ni_2In$-type structure to $Cu_6Sn_5$.

Copper-tin, $Cu_6Sn_5$, is one such electrode that holds promise for replacing graphite as the negative electrode for lithium-ion cells. It has already been discovered that $Cu_6Sn_5$ reacts with lithium essentially in two steps:

Reaction 1: $x\ Li+Cu_6Sn_5 \leftrightharpoons Li_xCu_6Sn_5$,
where x is approximately 9, and Reaction 2: $(22-x)Li+Li_xCu_6Sn_5 \leftrightharpoons 5\ Li_{4.4}Sn+6\ Cu$ During Reaction 1, the nickel-arsenide (NiAs) related structure of a $Cu_6Sn_5$ electrode transforms in an electrochemical cell at approximately 0.4 V vs. metallic lithium to a structure that closely resembles that of $Li_2CuSn$. Ideally, this transformation is represented by a reaction in which a small amount of Cu extrusion is necessary:

Reaction 1a: $10\ Li+Cu_6Sn_5 \leftrightharpoons 5\ Li_2CuSn+Cu$ in which one-sixth of the copper is extruded from the $Cu_6Sn_5$ structure. Ideal $Li_2CuSn$ has a lithiated zinc-blende type structure with cubic symmetry, in which the CuSn component adopts the crystallographic configuration of zinc-blende (ZnS); the lithium atoms occupy two crystallographically independent sites within the zinc-blende framework. In this transformation, which may be regarded as topotactic, despite an approximate 50% increase in crystallographic volume, 50% of the Sn atoms are displaced into neighboring interstitial sites of the $Cu_6Sn_5$ structure to create the [CuSn] zinc-blende framework as shown in FIG. 1. Thus there is a close structural relationship between the NiAs-related structure of $Cu_6Sn_5$ and the CuSn framework of the zinc-blende framework that facilitates the transformation of the one structure type to the other.

When the reaction goes to completion, i.e., to 0 V vs. metallic lithium, as shown by the ideal Reaction 2 above, all the copper is extruded from the $Li_2CuSn$ structure; the final lithiated tin product is $Li_{4.4}Sn$ that, like $Li_2CuSn$, has cubic symmetry. Note that in practice, however, under the dynamic, non-equilibrium conditions of an operating cell, there may be a small amount residual copper in a $Li_{2+x}Cu_{1-x}Sn$ component of the electrode at 0 V vs. metallic lithium, for example, when x=0.95. The theoretical electrode capacity for the complete lithiation of $Cu_6Sn_5$ to $Li_{4.4}Sn$, i.e., Reactions 1 and 2 is 605 mAh/g. Reaction 2 is only partially reversible, as evident from a steady capacity loss that occurs on long term cycling. The prior art has shown that by restricting the reaction to the topotactic process in Reaction 1a, when the lower voltage of a $Li/Cu_6Sn_5$ cell is restricted to 0.2 V vs. metallic lithium, a great improvement in cycling stability can be achieved, but at the expense of considerable capacity. Typically a rechargeable capacity of approximately 200 mAh/g can be achieved, which is only 33% of the full theoretical electrode capacity.

Without being bound by theory, the applicants believe that the capacity loss, when $Cu_6Sn_5$ electrodes are reacted with lithium to 0 V vs. metallic lithium, can be attributed in part to the formation of the end member of the binary $Li_xSn$ system, i.e., $Li_{4.4}Sn$ (alternatively $Li_{22}Sn_5$) after all the copper has been extruded from the $Li_2CuSn$ structure. In this respect, it is to be noted that the $Li_xSn$ has several binary phases that have the compositions, in order of increasing lithium content, $Li_2Sn_5$, LiSn, $Li_7Sn_3$, $Li_5Sn_2$, $Li_{13}Sn_5$, $Li_7Sn_2$ and $Li_{22}Sn_5$. The Li:Sn ratios in each of these phases is thus 0.4:1, 1:1; 2.33:1; 2.5:1; 2.6:1; 3.5:1; and 4.4:1, respectively. Each of these phases has a distinct crystallographic structure. As the lithium content increases, so does the unit cell volume per Sn atom. On lithiating metallic Sn to $Li_{4.4}Sn$, the crystallographic volume per Sn atom increases by a factor of approximately 3.5, which is far too severe for a metallic Sn electrode to be cycled without appreciable capacity loss.

In the lithium-copper-tin system, it is believed that the volumetric changes to the unit cell can be controlled if the lithium content per $Cu_6Sn_5$ unit is controlled, ideally to 3 Li per Sn atom. For example, in an ideal case, it is believed that the $Cu_6Sn_5$ electrode may operate by the following reaction pathway:

Reaction 1a: $10\ Li+Cu_6Sn_5 \leftrightharpoons 5\ Li_2CuSn+Cu$

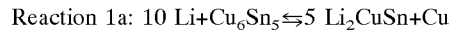
Reaction 2a: $x\ Li+Li_2CuSn \leftrightharpoons Li_{2+x}Cu_{1-x}Sn+x\ Cu$ For x=1, Reaction 2a becomes

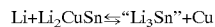
$$Li+Li_2CuSn \leftrightharpoons "Li_3Sn"+Cu$$

in which the lithiated product "$Li_3Sn$" would have a structure resembling the well known $Li_3Sb$-type structure, in which the Sb atoms constitute a face-centered-cubic array of atoms. Further reaction, of lithium with "$Li_3Sn$" results in the formation of $Li_{4.4}Sn$, which also has a cubic structure according to the reaction Reaction 3a: $1.4\ Li+"Li_3Sn" \rightarrow Li_{4.4}Sn$ that occurs possibly via a $Li_7Sn_2$ ($Li_{3.5}Sn$) intermediate composition.

The close structural relationship between $Cu_6Sn_5$ and the CuSn zinc-blende framework of $Li_2CuSn$ has already been stressed above. This close structural relationship is believed to contribute to the good reversibility of Reaction 1a. In Reaction 2a, the electrochemical reaction occurs by lithium insertion into the face-centered-cubic Sn array and simultaneous extrusion of metallic copper from the structure to yield "$Li_3Sn$", in which the inserted Li atoms simply occupy the copper positions in the $Li_2CuSn$ structure. With this arrangement, therefore, an idealized $Li_3Sn$ product can be regarded as being isostructural with $Li_2CuSn$ and with the known cubic $Li_3Sb$ structure. In practice, however, it is not yet clear if the ideal $Li_3Sn$ structure is produced, or whether the transformation to the $Li_{4.4}Sn$ phase occurs slightly earlier during the reaction. However, it is believed that the strong structural relationship that exists between $Li_2CuSn$ and $Li_{2+x}Cu_{1-x}Sn$ phases with the retention of a face-centered cubic Sn array is an important factor that contributes to the good reversibility of the $Li/Li_2CuSn$ and indeed $Li/Cu_6Sn_5$ cells. The theoretical capacity for combined Reactions 1a and 2a, i.e., for the reaction leading to 3 Li per Sn atom, or 15 Li per $Cu_6Sn_5$ unit is 412 mAh/g. This capacity value is 50% more than the theoretical capacity of the electrode when the $Cu_6Sn_5$ electrode is reacted with lithium to form $Li_2CuSn$ (275 mAh/g). Reaction 1a occurs at approximately 0.4 V against metallic lithium, whereas Reaction 2a occurs below 0.4 V, but above 0 V against metallic lithium. Reactions that occur after the extrusion of all the copper from $Li_2CuSn$ lead to binary $Li_xSn$ phases, such as $Li_{4.4}Sn$. It is further believed that the formation of these binary phases in which the ideal face-centered-cubic array of Sn atoms no longer exists plays a significant role in suppressing the reconstruction of this array on reversing the direction of current and hence the rechargeability of the lithium cells. Thus, it is believed that in order to optimize the rechargeability of cells with $Cu_6Sn_5$ negative electrodes, such as $Cu_6Sn_5/LiCoO_2$ cells, the voltage of the lithiated $Cu_6Sn_5$ electrode should be controlled during charge to be less than 0.2 V and greater than 0 V vs. metallic lithium.

Figure 2:
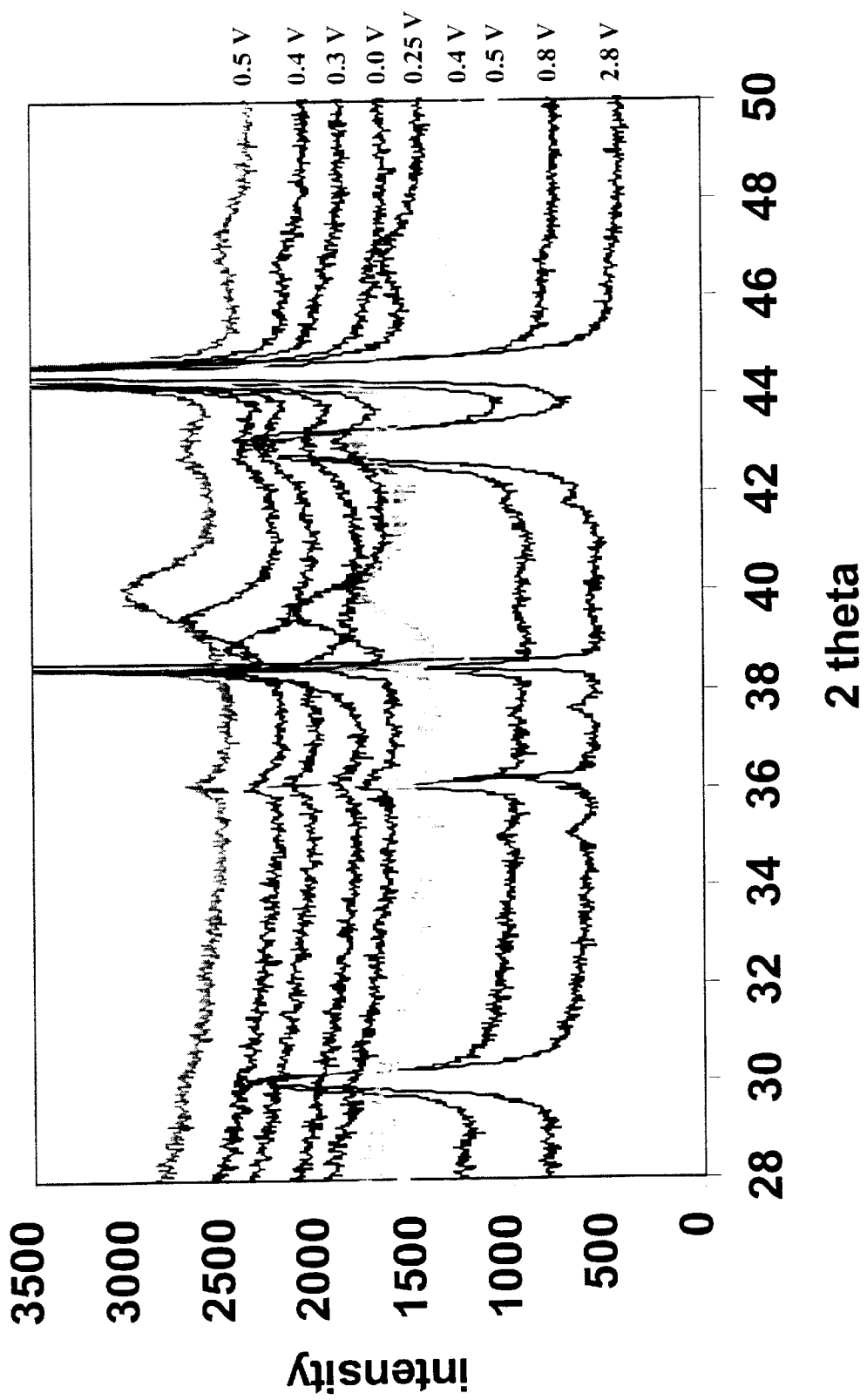
FIG. 2 shows in-situ X-ray diffraction data of a $Cu_6Sn_5$ electrode in a $Li/Cu_6Sn_5$ cell obtained at 2.8 V (initial open-circuit voltage), 0.8 V, 0.5 V, 0.4 V, 0.25 V, and 0.0 V during discharge, and at 0.3 V, 0.4 V, and 0.5 V during the subsequent charge.

Evidence for such a reaction mechanism has been gathered from an in-situ X-ray diffraction study of $Li/Cu_6Sn_5$ cells employing a Ni substrate for the $Cu_6Sn_5$ electrode. The results of this in-situ X-ray diffraction study are shown in FIG. 2. This figure shows the X-ray diffraction pattern of the $Cu_6Sn_5$ electrode when the cell was in its original state with an open circuit potential of 2.8 V, and thereafter at various states of discharge and charge vs. a metallic Li electrode, namely during discharge at 0.8 V, 0.5 V, 0.4 V, 0.25 V, 0.0 V, and then on the subsequent charge at 0.3 V, 0.4 V and 0.5 V. In the X-ray diffraction patterns at 2.8 V, 0.8 V and 0.5 V during the initial discharge, the $Cu_6Sn_5$ peaks are clearly visible, for example, at approximately 43 ° 2θ. At 0.4 V, the peaks due to the $Li_2CuSn$ peaks appear, for example, at approximately 40.1 ° 2θ. At 0.0 V the broad peak at approximately 38.2 ° 2θ can be attributed to $Li_{4.4}Sn$. Of particular significance, however, is that on discharge between 0.4 and 0.0 V the $Li_2CuSn$ peak at 40.1 ° 2θ maintains its intensity but shifts gradually toward 38.2 ° 2θ, and on the subsequent charge between 0.0 and 0.5 V, the peak shifts gradually back from 38.2 ° 2θ to 40.1 ° 2θ. Such X-ray diffraction data are strongly suggestive of a solid solution system $Li_{2+x}Cu_{1-x}Sn$ in which the Sn array remains intact for 0<x<1, i.e., to a composition approaching $Li_3Sn$. In practice, it is believed that a small amount of copper may be necessary to stabilize the face-centered-cubic Sn array. Of particular significance also is that during this complete reaction from $Li_2CuSn$ (with a lattice parameter, a≈6.28 Å) to a "$Li_3Sn$" structure (with a <6.6 Å) in which a face-centered-cubic array of Sn atoms is maintained, the volume expansion is less than 16% per Sn atom. By contrast, the transformation of $Li_2CuSn$ to $Li_{4.4}Sn$ necessitates the breaking of Sn—Sn bonds and the face-centered-cubic array; in this instance, the volume expansion per tin atom is significantly larger, approximately 56.7%. The large increase in unit cell volume is accounted for by a large cubic supercell in the $Li_{4.4}Sn$ structure, with a lattice parameter of a≈19.8 Å. Thus, there is a significant advantage in cycling $Cu_6Sn_5$ electrodes to compositions before the $Li_{4.4}Sn$ structure is reached.

This invention relates to compositional changes to $Cu_6Sn_5$ electrodes and to operating voltage conditions to improve the capacity and cycling stability of such electrodes in non-aqueous electrochemical cells.

In the first embodiment of the invention, the $Cu_6Sn_5$ electrode is partially substituted by one or more other metals, M including Si, in $Cu_{6-x}M_xSn_5$ preferably one or more transition metals, and more preferably one or more first row transition metals. In particular, the M atoms can be selected those first-row transition metals with lower atomic number than copper, such as Zn, Ni, Co, Fe, Mn, Cr, V, Ti and Sc to act as a sink for electrons associated with the incoming lithium atoms. The substitution of Cu atoms by M atoms is at most 50% (i.e., $x_{max}=3$), and preferably between 0.1 and 16.6% (i.e., $x \leq 1$). In a second embodiment of the invention, the non-aqueous lithium cells containing such intermetallic electrodes are operated such that the intermetallic electrodes are reacted electrochemically between 1.5 V and above 0 V with respect to metallic lithium, preferably between 1.5 and 0.01 volts, more preferably between 1.2 and 0.01 volts and most preferably between 1.2 and 0.1 volts.

In a third embodiment of the invention, the M atoms of the $Cu_{6-x}M_xSn_5$ electrode can include Li atoms to counter the irreversible capacity loss that is encountered during the first cycle of $Li/Cu_{6-x}M_xSn_5$ cells. This irreversible capacity loss is believed to be associated first, with a passivating layer containing lithium on the surface of the lithiated $Cu_{6-x}M_xSn_5$ electrode and second, with the inability of all the lithium to be extracted from the lithiated $Cu_{6-x}M_xSn_5$ electrode on reversing the current. It is believed that the irreversible capacity loss can be countered if the initial $Cu_{6-x}M_xSn_5$ electrode contains at least a small amount of lithium, either within the $Cu_{6-x}M_xSn_5$ structure, or outside it, prior to the assembly of the $Li/Cu_{6-x}M_xSn_5$ cell.

The structures of intermetallic compounds are very often not represented by ideal structural configurations. Rather, they may be represented by disordered or partially disordered structures. The $Cu_{6-x}M_xSn_5$ electrodes and lithiated electrode structures of this invention, notably those having the NiAs, $Ni_2In$ and lithiated zinc-blende-type structures, should therefore not be restricted to ideal ordered structural configurations. For example, in a lithiated $Cu_{6-x}M_xSn_5$ zinc-blende-type structure the Li, Cu and M atoms may be randomly disordered, or at least partially disordered over three lithium sites in a $Li_3Sb$-type structure in which the Sn atoms occupy the face-centered-cubic Sb sites. Therefore, in a fourth embodiment, the invention includes randomly disordered and partially disordered $Cu_{6-x}M_xSn_5$ and lithiated $Cu_{6-x}M_xSn_5$ electrode structures.

Intermetallic compounds are often non-stoichiometric compounds. In this respect, the structure of the intermetallic $Cu_6Sn_5$ compound can be regarded as having a non-stoichiometric nickel-arsenide (NiAs) type structure in which one-sixth of the copper atoms partially occupy the interstitial trigonal bipyramidal sites of the CuSn ($Cu_5Sn_5$) NiAs-type framework. In this instance, $Cu_6Sn_5$ can be designated by the non-stoichiometric formula $Cu_{1.2}Sn$. On the other hand, occupation of all the trigonal bipyramidal interstitial sites would yield a $Ni_2In$-type structure; from this viewpoint, the $Cu_6Sn_5$ structure can be regarded as having a defect $Ni_2In$-type structure. It is possible, therefore, that small compositional and structural variations may be possible in the $Cu_{6-x}M_xSn_5$ electrodes of the invention. The invention includes such variations in the composition of the $Cu_{6-x}M_xSn_5$ electrode, specifically in the ratio of (Cu+M) atoms to Sn atoms, preferably such that the (Cu+M):Sn ratio falls within the range 1.5:1 to 1.0:1 thus allowing for non-stoichiometric $Cu_{6-x}M_xSn_5$ electrodes that are either slightly (Cu+M) rich or (Cu+M) deficient with respect to the number of Sn atoms.

When lithium cells are operated such that the intermetallic $Cu_{6-x}M_xSn_5$ electrodes are operated below approximately 0.2 volts with respect to metallic lithium, copper atoms and M atoms are extruded from a Sn array of atoms. It is believed that the addition of surplus Cu and M in finely-divided, dispersed and intimately mixed form in the initial electrode serves to enhance the reversibility of the reaction in the event that some of the extruded Cu and M become electronically disconnected from the electrode. In a fifth embodiment of the invention, therefore, the intermetallic electrodes may be fabricated prior to use to contain an additional amount of Cu and M in finely-divided, dispersed and intimately mixed form, up to about 10% by weight. In a sixth embodiment of the invention, the current collecting substrate can be optionally comprised of a metallic foil of the M metal to provide chemical compatibility between the substrate and the extruded M atoms of the intermetallic electrode.

In order to prevent or suppress electrochemical sintering and grain growth of the intermetallic component, the lithiated intermetallic component or the extruded metal component of the electrode during electrochemical cycling, a grain-growth inhibiting component can be added to the electrode in finely divided powder form with an average particle size, for example, of less than about 5 microns and, for example, less than 15% by weight. The grain-growth inhibitor is preferentially carbon, which may also act to provide additional capacity to the cell, and to provide porosity to the electrode to allow access of the electrolyte to the individual intermetallic particles. The carbon additive is preferentially graphite.

When the inventive electrodes are used as a negative electrode in a non-aqueous lithium electrochemical cell, the positive electrode can be selected from any suitable and compatible electrode material such that the electrochemical couple yields a cell potential of greater than 1 V. Preferred positive electrode materials are those known in the art, particularly those derived from lithium-metal-oxides with layered or spinel-type structures, such as $LiCoO_2$, $LiNiO_2$, $LiMnO_2$, $LiMn_2O_4$, $LiFePO_4$ or derivatives thereof, such as substituted or modified compounds, for example, $LiNi_{0.8}Co_{0.2}O_2$, $LiMn_{0.9}Co_{0.1}O_2$, $LiMn_{0.5}Ni_{0.5}O_2$, $Li_{1.05}Mn_{1.95}O_4$, $LiCoPO_4$ and $LiMn_{0.4}Fe_{0.6}PO_4$.

We have found that structural control of lithiated $Cu_{6-x}M_xSn_5$ electrodes provides electrochemical cells with enhanced capacity and cycle life to those known in the art, and that structural control can be achieved by regulating the voltage of the cells such that the potential of the lithiated intermetallic negative electrode at the top of charge is less than 0.2 V but greater than 0 V vs. metallic lithium. Voltage control of the cells, and therefore structural control of the lithiated $Cu_{6-x}M_xSn_5$ electrodes can be imposed either electronically, for example, by microprocessor devices, or it can be imposed chemically, for example, by limiting the installed capacity of the positive electrode, such that the potential of the lithiated intermetallic negative electrode is always greater than 0 V vs. metallic lithium. For example, in a $Cu_6Sn_5$/electrolyte/$LiCoO_2$ cell, an amount of the positive $LiCoO_2$ electrode can be installed in the cell such that the composition of the lithiated $Cu_{6-x}M_xSn_5$ electrode at the top of charge never exceeds 3 Li per Sn. The following examples describe the principles of the invention as contemplated by the inventors, but they are not to be construed as limiting examples.

EXAMPLE 1

Figure 3:
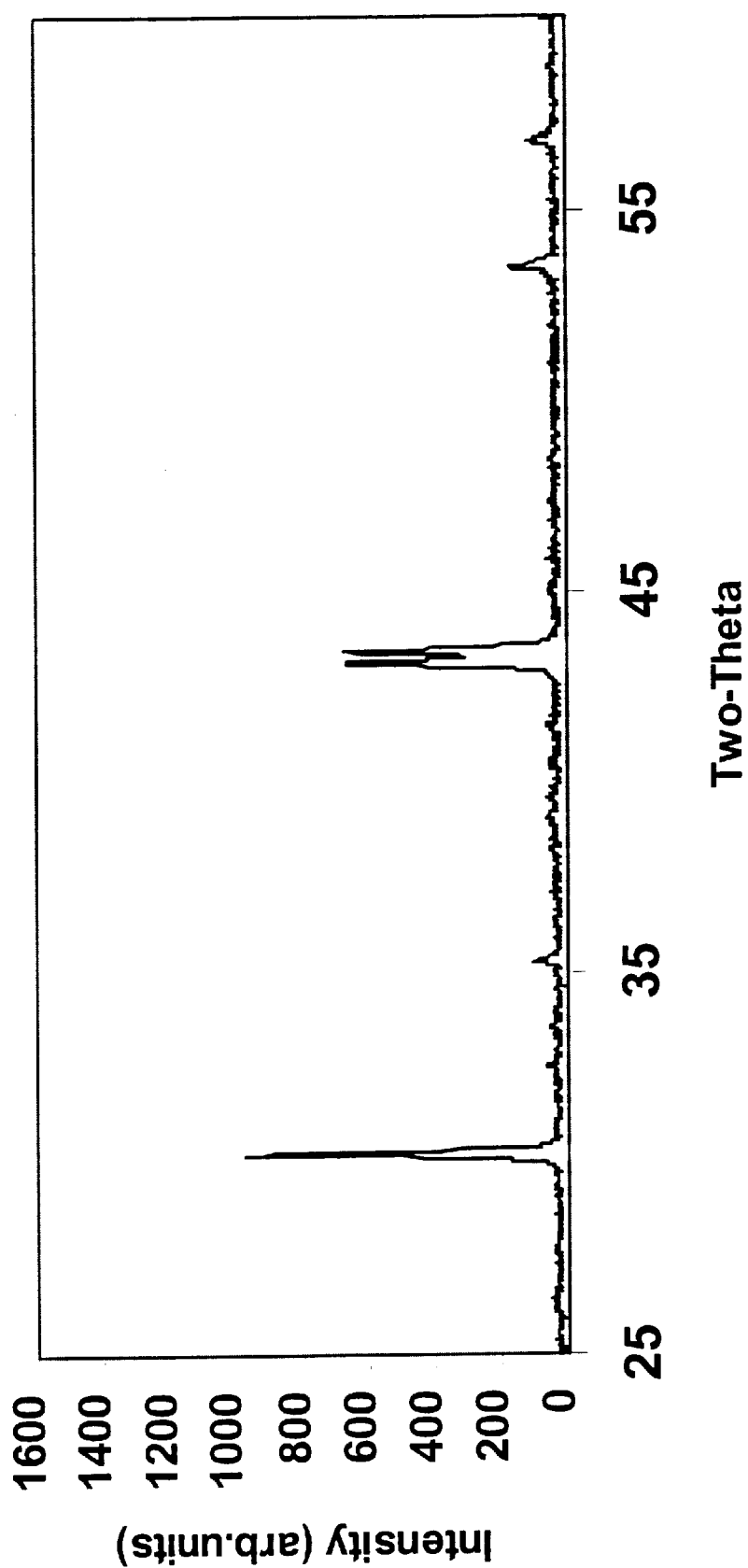
FIG. 3 shows the X-ray diffraction pattern of a standard $Cu_6Sn_5$ sample obtained with CuKα radiation at room temperature.

A standard $Cu_6Sn_5$ sample (control) was synthesized by reacting metallic tin and metallic copper in stoichiometric amounts at 400° C. under argon for 12 hours. The sample was ground by mechanical milling to an average particle size of less than 10 microns. The X-ray diffraction data, collected on a Siemens D5000 powder diffractometer with CuKα radiation showed that the $Cu_6Sn_5$ product was an essentially single-phase product as shown in FIG. 3.

EXAMPLE 2

Substituted $Cu_{6-x}M_xSn_5$ compounds with M=Zn, Ni, Fe, and Mn were synthesized in the same fashion as the $Cu_6Sn_5$ sample in example 1 with the required amounts of Cu, M, and Sn metals for x=1. The samples were ground by mechanical milling to an average particle size of less than 10 microns. The X-ray diffraction data showed that all the products were essentially single-phase compounds isostructural with $Cu_6Sn_5$.

EXAMPLE 3

The intermetallic $Cu_6Sn_5$ and $Cu_{6-x}M_xSn_5$ materials were evaluated as electrodes in coin cells (size 1225) 12 mm diameter and 2.5 mm high against a counter lithium electrode. The cells had the configuration: Li/1M $LiPF_6$ in ethylene carbonate, diethyl carbonate (50:50)/intermetallic electrode, in which the intermetallic electrode consisted of $Cu_6Sn_5$, $Cu_5ZnSn_5$, $Cu_5NiSn_5$, $Cu_5FeSn_5$ and $Cu_5MnSn_5$. For the intermetallic electrodes, blends were made containing approximately 6 mg of the intermetallic compound, i.e., approximately 81% by weight of the electrode, intimately mixed with approximately 10% by weight of Kynar 2801 binder and approximately 9% by weight of carbon (XC-72) in tetrahydrofuran (THF). The electrode blends were laminated onto either thin copper or nickel foil substrate current collectors. Metallic lithium foil was used as the counter electrode. Li/$Cu_6Sn_5$ and Li/$Cu_{6-x}M_xSn_5$ cells were discharged and charged at constant current (typically 0.1 mA) within the voltage ranges 1.2 to 0 V, 1.2 to 0.01 V, 1.2 to 0.05 V, and 1.2 to 0.10 V.

Figure 4:
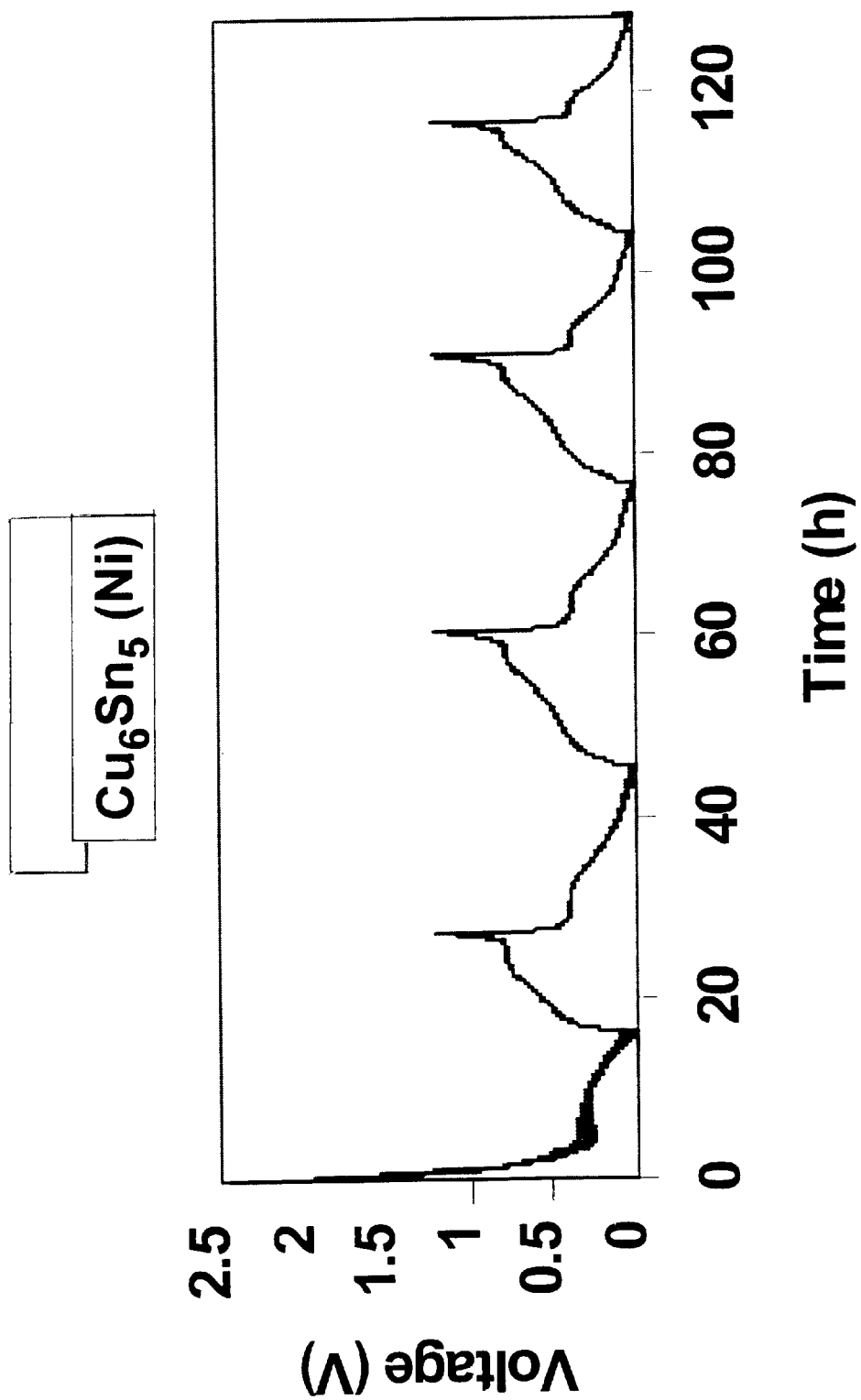
FIG. 4 shows the typical electrochemical profiles for the first five cycles of a $Li/Cu_6Sn_5$ cell with the $Cu_6Sn_5$ electrode laminated on a Ni substrate, cycled between 1.2 and 0 V.
Figure 5:
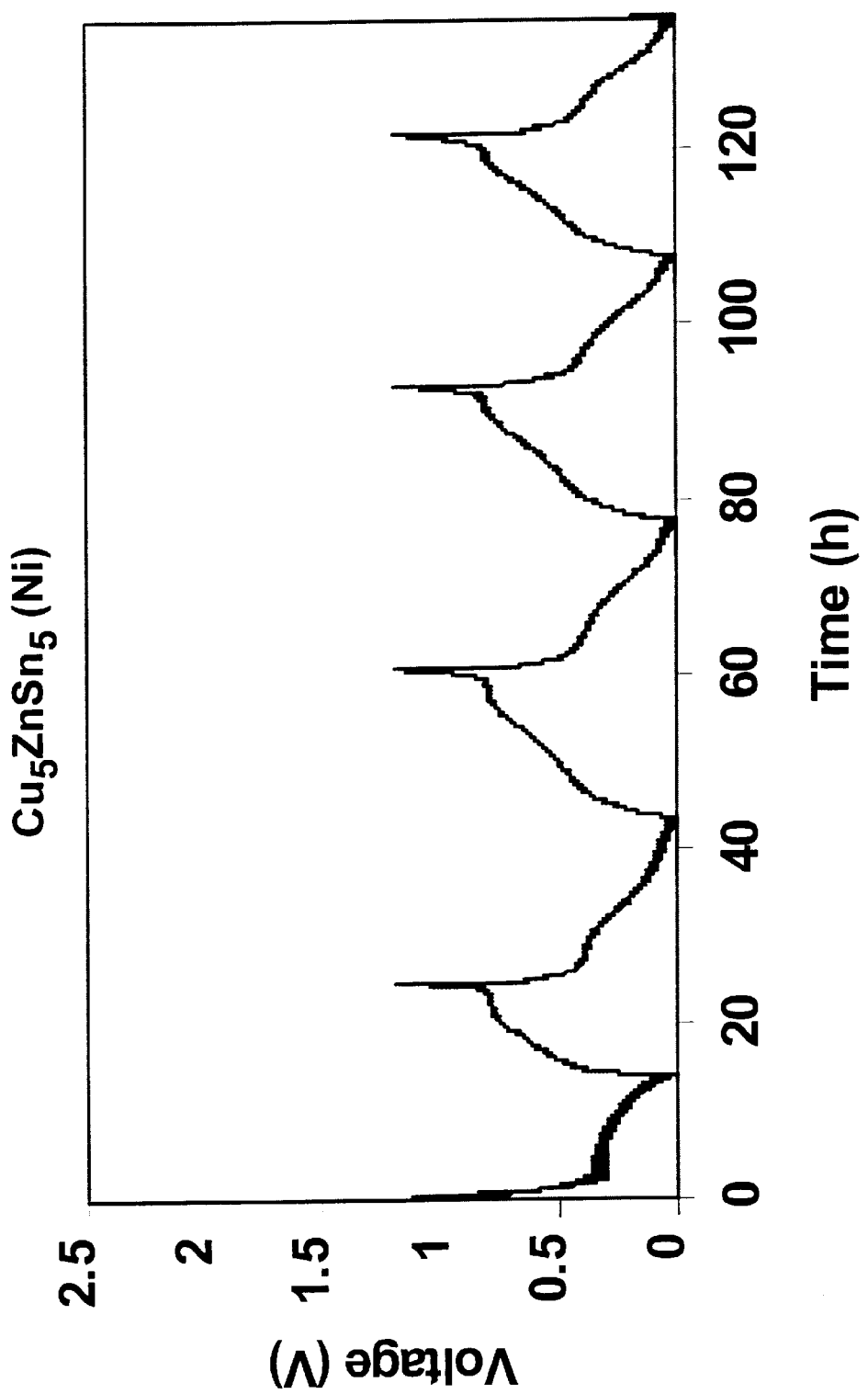
FIG. 5 shows the typical electrochemical profiles for the first five cycles of a $Li/Cu_5ZnSn_5$ cell with the $Cu_5ZnSn_5$ electrode laminated on a Ni substrate, cycled between 1.2 and 0 V.
Figure 6:
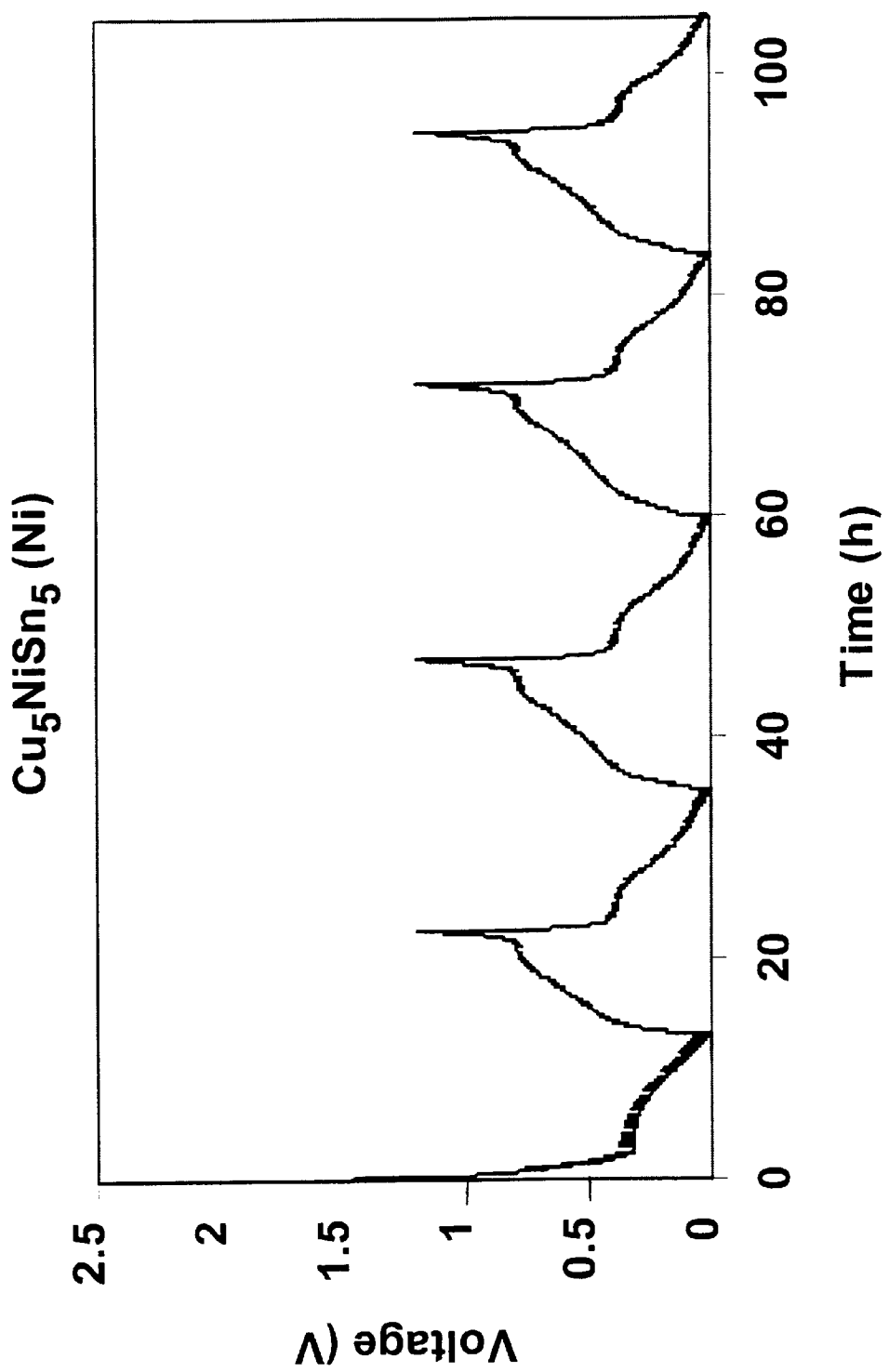
FIG. 6 shows the typical electrochemical profiles for the first five cycles of a $Li/Cu_5NiSn_5$ cell with the $Cu_5NiSn_5$ electrode laminated on a Ni substrate, cycled between 1.2 and 0 V.
Figure 7:
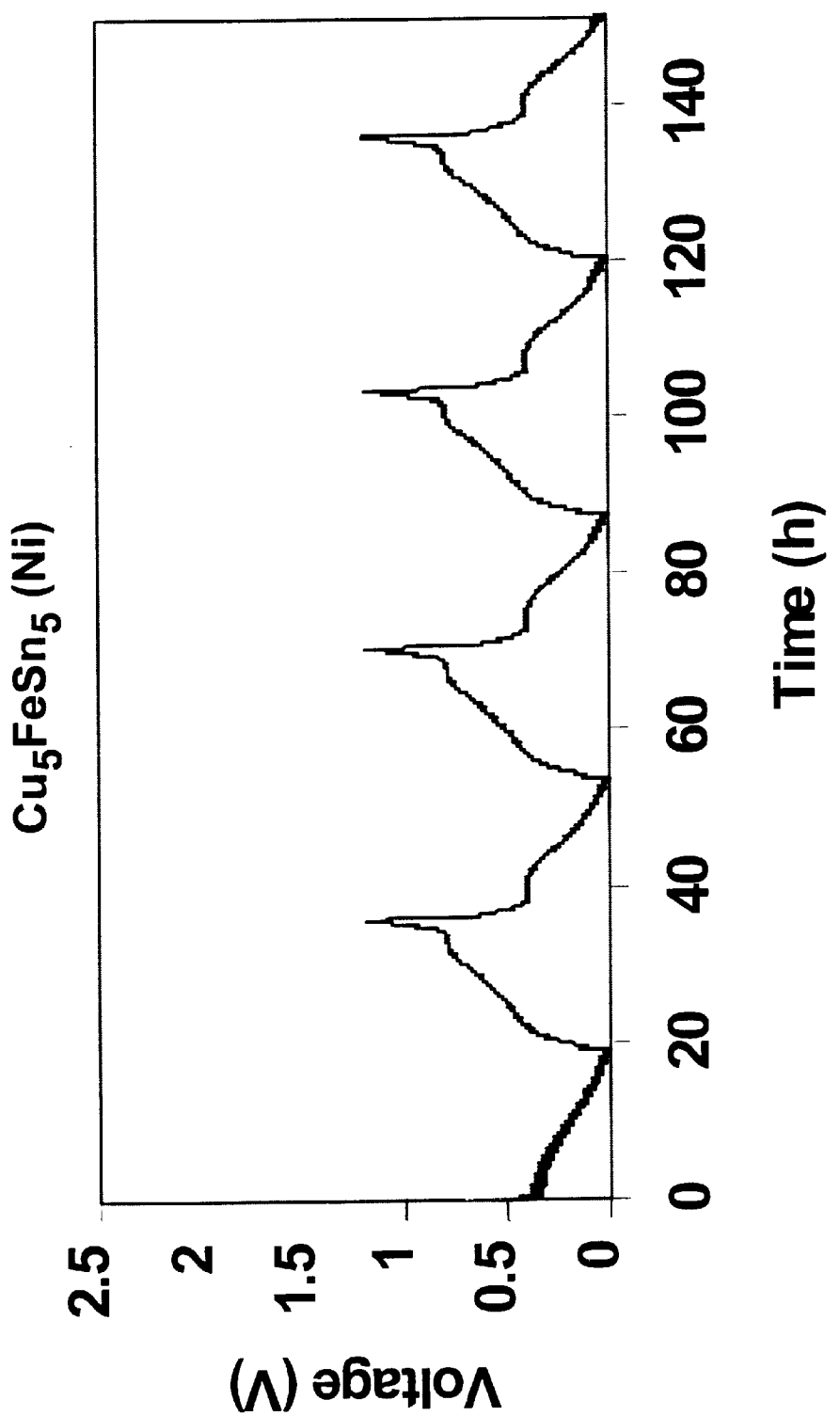
FIG. 7 shows the typical electrochemical profiles for the first five cycles of a $Li/Cu_5FeSn_5$ cell with the $Cu_5FeSn_5$ electrode laminated on a Ni substrate, cycled between 1.2 and 0 V.
Figure 8:
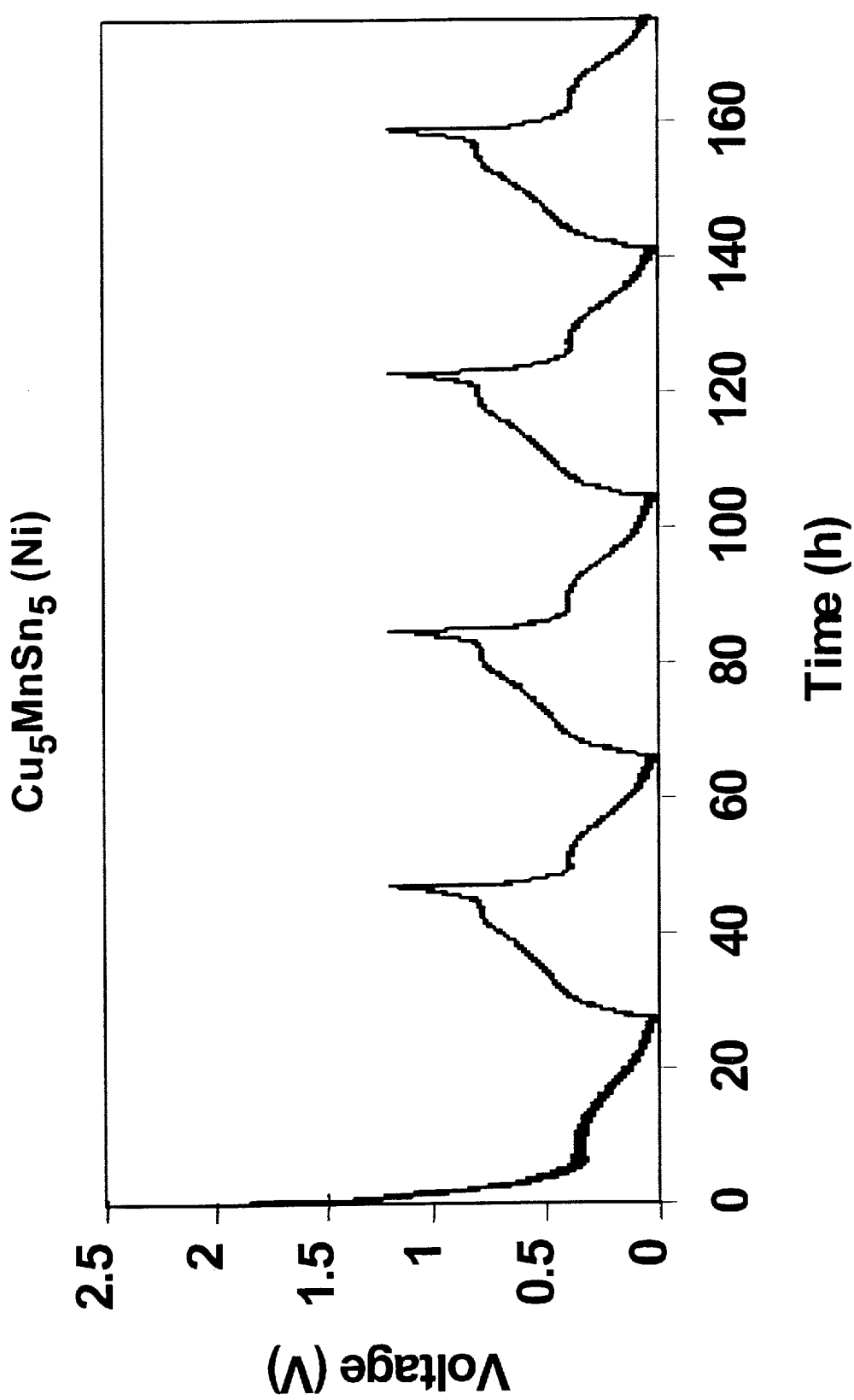
FIG. 8 shows the typical electrochemical profiles for the first five cycles of a $Li/Cu_5MnSn_5$ cell with the $Cu_5MnSn_5$ electrode laminated on a Ni substrate, cycled between 1.2 and 0.01 V.
Figure 9:
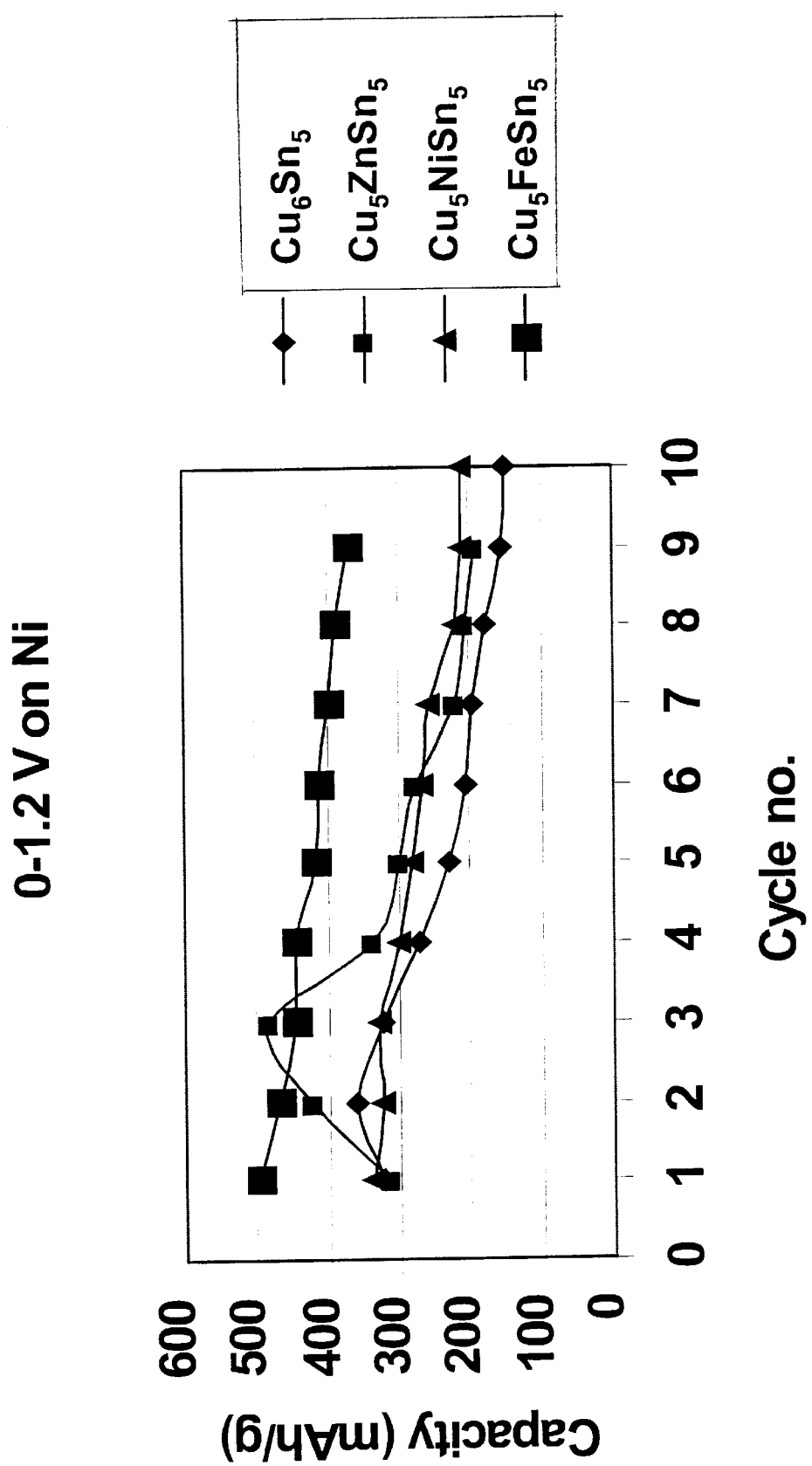
FIG. 9 shows a collective plot of capacity vs. cycle number for $Li/Cu_6Sn_5$, $Li/Cu_5ZnSn_5$ $Li/Cu_5NiSn_5$ and $Li/Cu_5FeSn_5$ cells (Ni substrates) cycled between 1.2 and 0 V.
Figure 10:
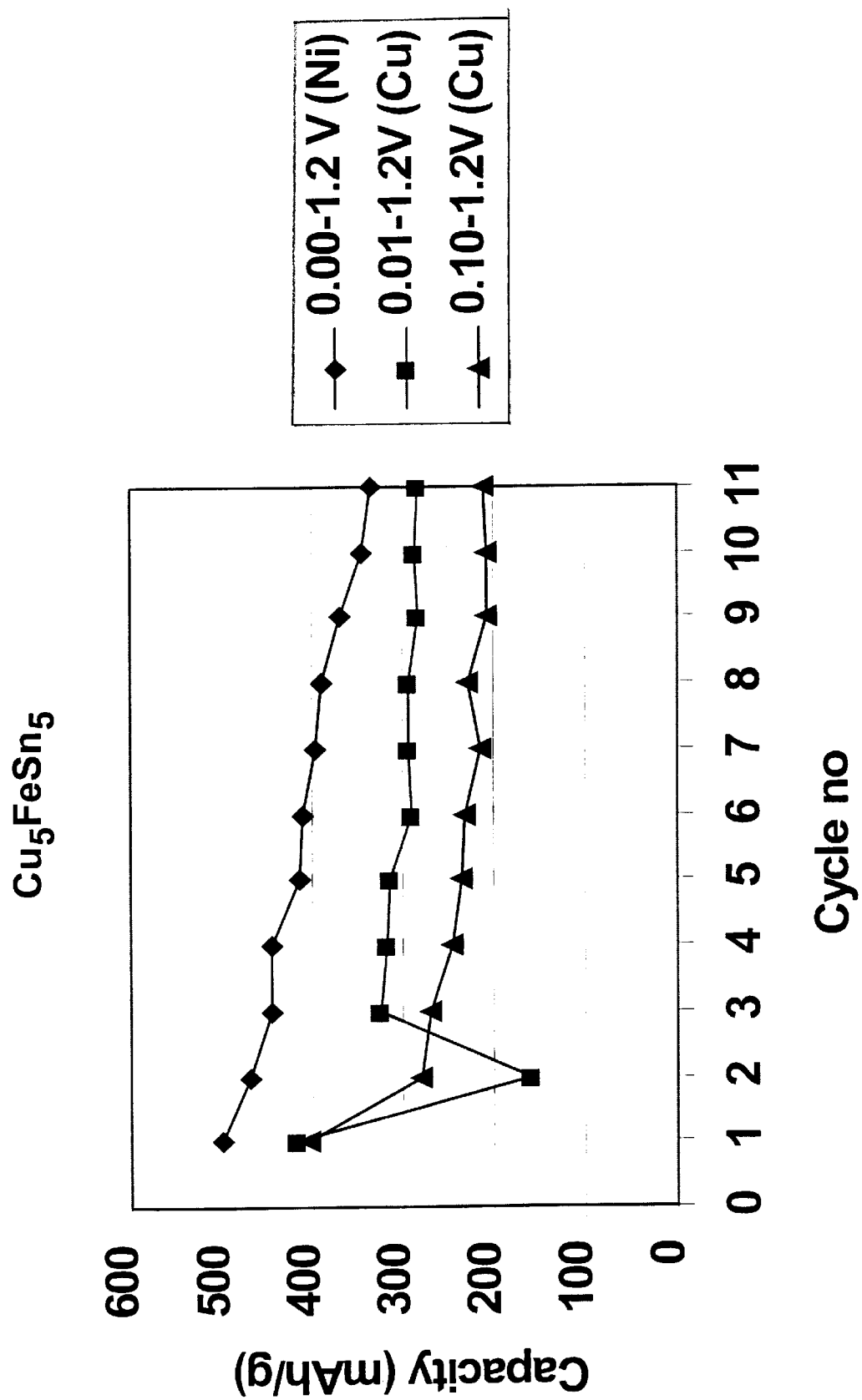
FIG. 10 shows a collective plot of capacity vs. cycle number for $Li/Cu_5FeSn_5$ cells cycled between 1.2 and 0 V (Ni substrate), and between 1.2 and 0.01 V and between 1.2 and 0.10 V (Cu substrate)
Figure 11:
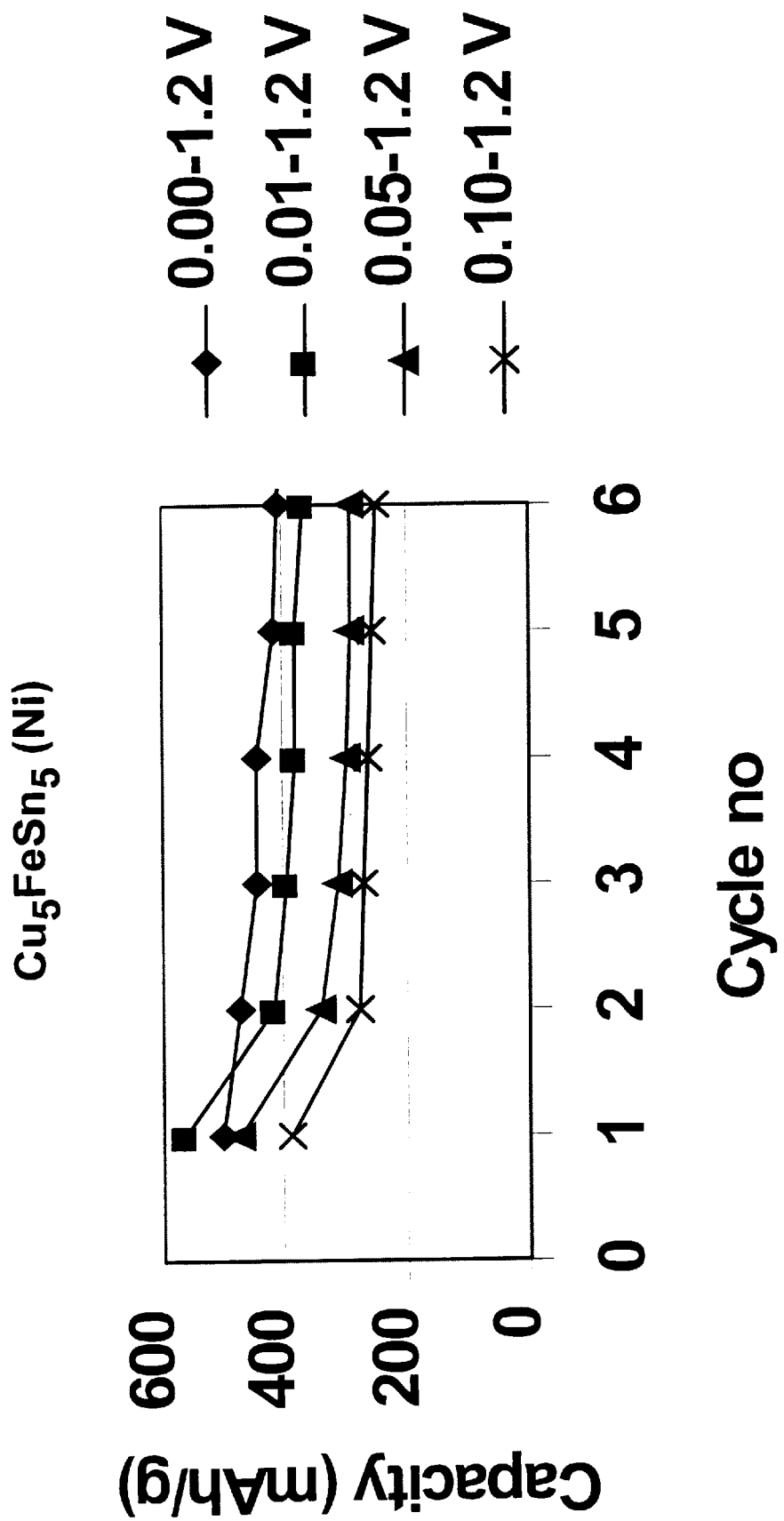
FIG. 11 shows a collective plot of capacity vs. cycle number for $Li/Cu_5FeSn_5$ cells cycled between 1.2 and 0 V; between 1.2 and 0.01 V; between 1.2 and 0.05 V; and between 1.2 and 0.10 V (Ni substrate)
Figure 12:
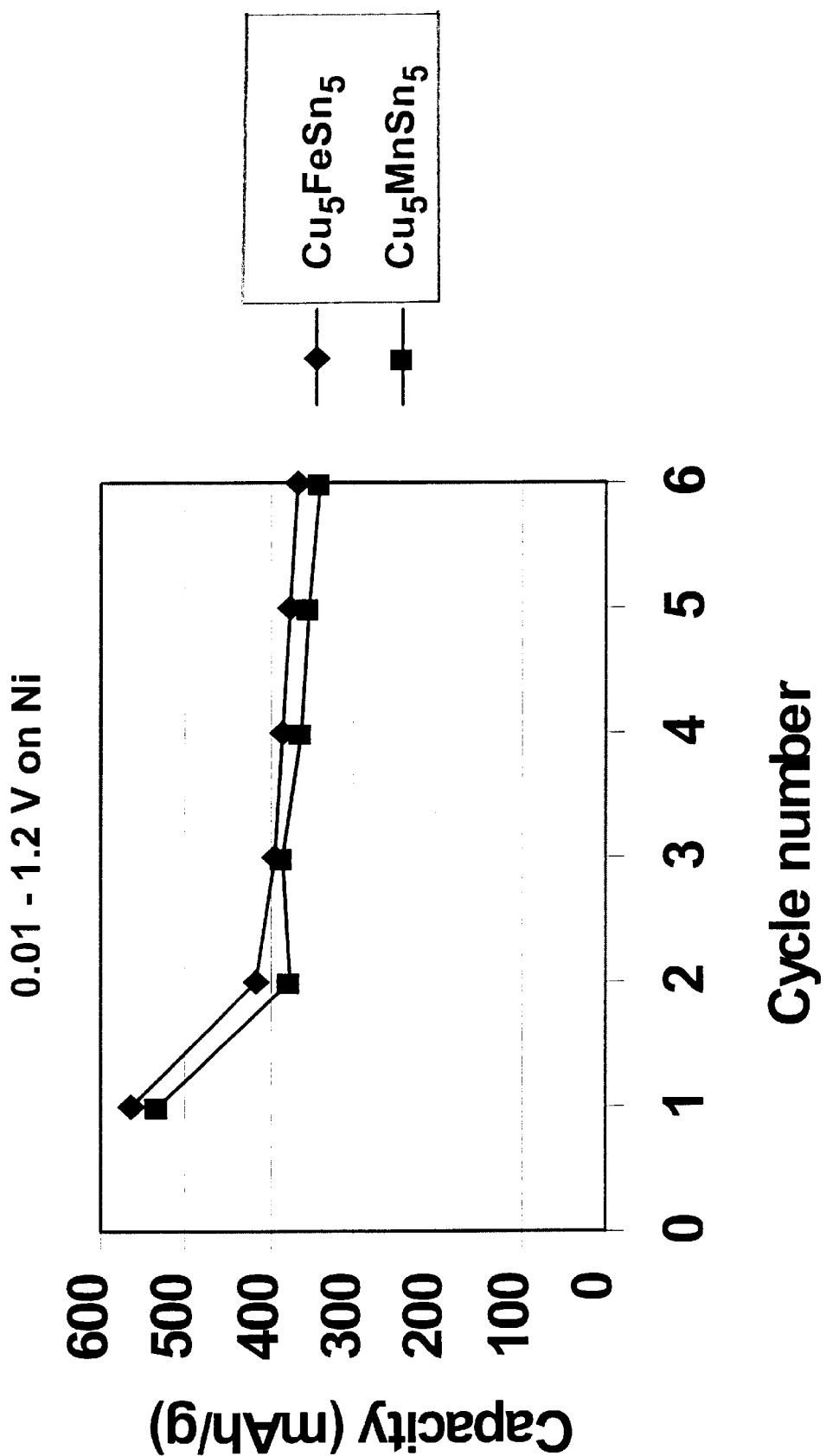
FIG. 12 shows a collective plot of capacity vs. cycle number for $Li/Cu_5FeSn_5$ and $Li/Cu_5MnSn_5$ cells cycled between 1.2 and 0.01 V (Ni substrate)

Typical electrochemical data for Li/$Cu_6Sn_5$ and Li/$Cu_{6-x}M_xSn_5$ cells are provided in various plots, as shown in FIG. 4: a Li/$Cu_6Sn_5$ cell, nickel substrate, voltage limits 1.2 to 0 V; FIG. 5: a Li/$Cu_5ZnSn_5$ cell, nickel substrate, voltage limits 1.2 to 0 V; FIG. 6: a Li/$Cu_5NiSn_5$ cell, nickel substrate, voltage limits 1.2 to 0 V; FIG. 7: a Li/$Cu_5FeSn_5$ cell, nickel substrate, voltage limits 1.2 to 0 V; FIG. 8: a Li/$Cu_5MnSn_5$ cell, nickel substrate, voltage limits 1.2 to 0.01 V; FIG. 9: a collective plot of capacity vs. cycle number for Li/$Cu_6Sn_5$, Li/$Cu_5ZnSn_5$ Li/$Cu_5NiSn_5$ and Li/$Cu_5FeSn_5$ cells (Ni substrates) cycled between 1.2 and 0 V; FIG. 10: a collective plot of capacity vs. cycle number for Li/$Cu_5FeSn_5$ cells cycled between 1.2 and 0 V (Ni substrate), and between 1.2 and 0.01 V and between 1.2 and 0.10 V (Cu substrate); FIG. 11: a collective plot of capacity vs. cycle number for Li/$Cu_5FeSn_5$ cells cycled between 1.2 and 0 V; between 1.2 and 0.01 V; between 1.2 and 0.05 V; and between 1.2 and 0.10 V (Ni substrate); FIG. 12: a collective plot of capacity vs. cycle number for Li/$Cu_5FeSn_5$ and Li/$Cu_5MnSn_5$ cells cycled between 1.2 and 0.01 V (Ni substrate).

These data, particularly the capacity vs. cycle no. plots in FIGS. 9, 10, 11 and 12 show that standard Li/$Cu_6Sn_5$ cells lose capacity rapidly when cycled between 1.2 and 0 V vs. Li, as do Li/$Cu_{6-x}M_xSn_5$ cells where M=Zn, Ni, and Fe. By contrast, when Li/$Cu_{6-x}M_xSn_5$ cells are cycled between 1.2 and either 0.1, 0.05, or 0.01 V vs. Li, the cycling stability is markedly improved (FIGS. 10, 11, and 12), particularly when M=Fe or Mn. Of significance is that the greatest stability is achieved when cells are cycled with $Cu_{6-x}M_xSn_5$ electrode capacities less than 400 mAh/g, i.e., corresponding to the reaction with less than 3 Li per Sn.

EXAMPLE 4

Figure 13:
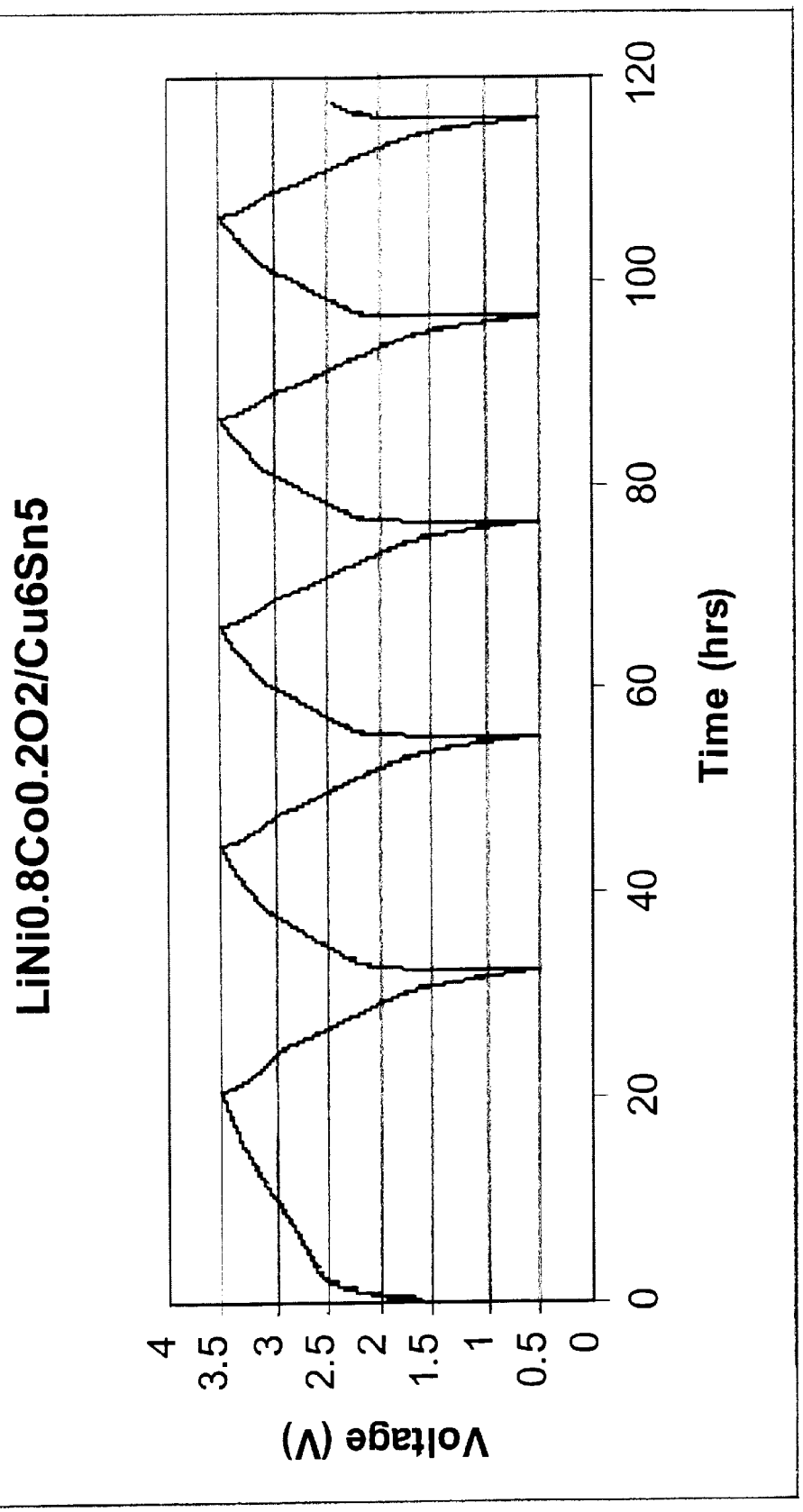
FIG. 13 shows a characteristic voltage profile of a $Cu_6Sn_5/LiNi_{0.8}Co_{0.2}O_2$ cell cycled between 3.5 and 0.5 V.

For the purpose of demonstrating the utility of $Cu_{6-x}M_xSn_5$ as a negative electrode in an electrochemical cell containing a lithium-transition-metal oxide positive electrode, a $Cu_6Sn_5$ (x=0) electrode was coupled against a $LiNi_{0.8}Co_{0.2}O_2$ electrode. The cell had the configuration: $Cu_6Sn_5$/1M $LiPF_6$ in ethylene carbonate, diethyl carbonate (50:50)/$LiNi_{0.8}Co_{0.2}O_2$, in which the installed capacity of the cathode was limited to prevent the $Cu_6Sn_5$ electrode from being fully lithiated to a composition $Li_{22}Cu_6Sn_5$ (i.e., $5Li_{4.4}Sn+6Cu$), thereby controlling the potential of the fully charged $Cu_6Sn_5$ electrode to be greater than 0 V vs. metallic lithium; in this respect, the masses of the $Cu_6Sn_5$ and $LiNi_{0.8}Co_{0.2}O_2$ electrodes were calculated to be such that complete extraction of lithium from the $LiNi_{0.8}Co_{0.2}O_2$ electrode would yield a Li:Sn ratio of 2:1 in the charged, lithiated $Cu_6Sn_5$ electrode. For the $Cu_6Sn_5$ electrode, a blend was made containing approximately 12 mg of $Cu_6Sn_5$, i.e., approximately 84% by weight of the electrode, intimately mixed with approximately 8% by weight of Kynar 2801 binder and approximately 8% by weight of carbon (4% acetylene black, 4% SFG-6) in N-methylpyrrolidone (NMP). For the $LiNi_{0.8}Co_{0.2}O_2$ electrode, a blend was made containing approximately 18 mg of $LiNi_{0.8}Co_{0.2}O_2$ i.e., approximately 84% by weight of the electrode, intimately mixed with approximately 8% by weight of Kynar 2801 binder and approximately 8% by weight of carbon (4% acetylene black, 4% SFG-6) in NMP. The $Cu_6Sn_5$ and $LiNi_{0.8}Co_{0.2}O_2$ electrode blends were laminated onto thin copper and aluminum foil substrate current collectors, respectively. The cell was charged and discharged at constant current (typically 0.1 mA) within the voltage range 3.5 to 0.5 V, as shown in FIG. 13.

Intermetallic $Cu_{6-x}M_xSn_5$ electrodes, where M is one or more metal elements, preferably a transition metal element or elements have been discovered to impart excellent electrochemical behavior in lithium cells with respect to delivered capacity and cycling stability when the cells are cycled between voltage limits such that the lower voltage limit of the $Cu_{6-x}M_xSn_5$ electrode is kept above 0 V vs. metallic lithium. The new electrodes provide a significant improvement over the delivered capacity and cycling capability of state-of-the-art copper-tin electrodes.

Figure 14:
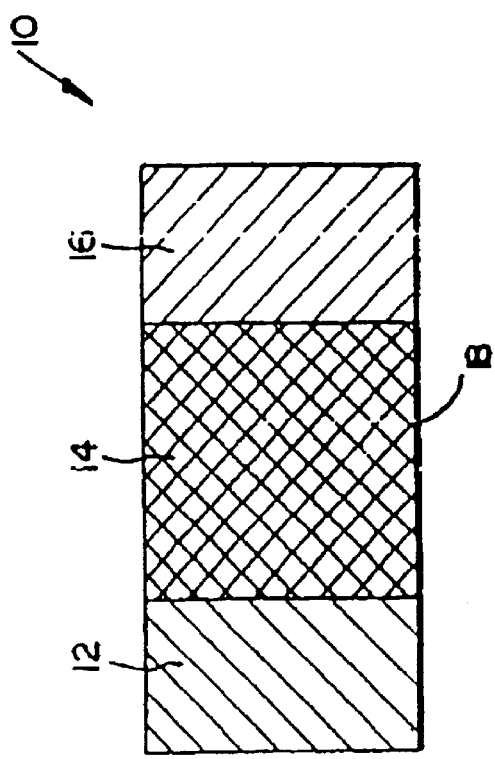
FIG. 14 depicts a schematic representation of an electrochemical cell.
Figure 15:
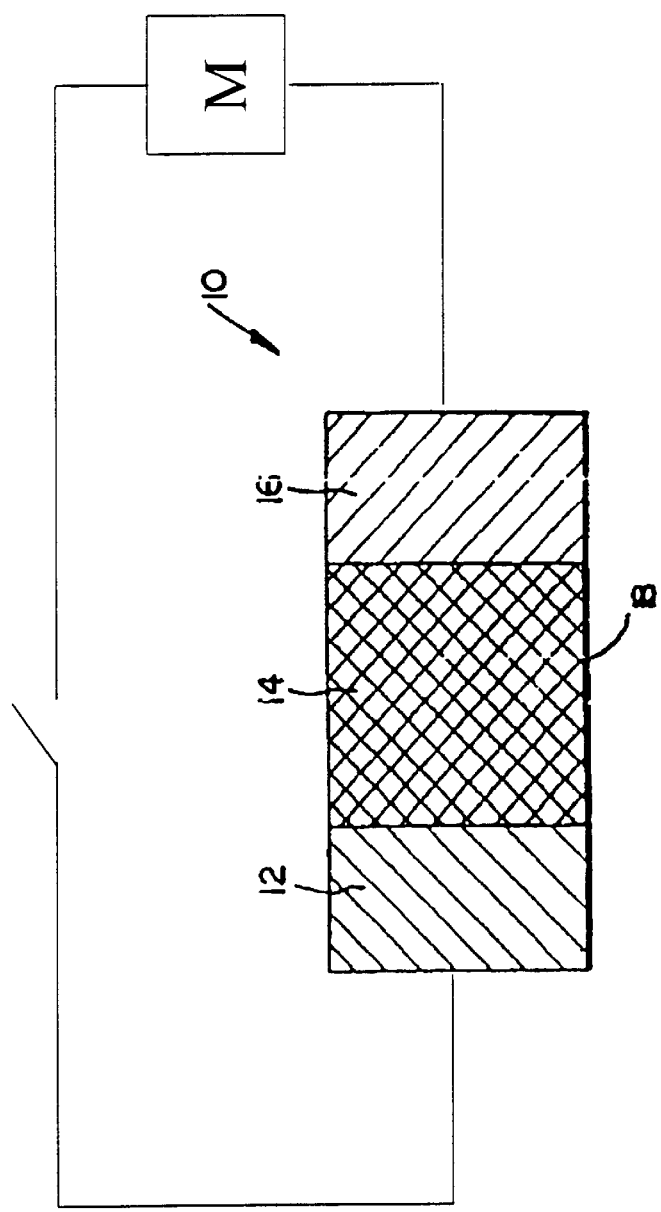
FIG. 15 is a schematic representation of a microprocessor controlled circuit, in which M is the microprocessor.

As previously stated, the invention relates to an intermetallic negative electrode for a non-aqueous electrochemical lithium cell 10, as seen in FIG. 14, having a negative electrode 12 separated from a positive electrode 16 by an electrolyte 14, all contained in an insulating housing 18 with suitable terminals (not shown) being provided in electronic contact with the negative electrode 12 and the positive electrode 16. Binders and other materials normally associated with both the electrolyte and the negative and positive electrodes are well known in the art and are not described herein, but are included as is understood by those of ordinary skill in this art. A schematic illustration of one example of a cell circuit that contains a microprocessor, M, to control the potential of the cell during charge is shown in FIG. 15.

We believe that the invention includes an intermetallic negative electrode for a non-aqueous electrochemical lithium cell, the negative electrode being defined by the general formula $Cu_{6-x}M_xSn_5$ in which $0<x\leq3$, and in which M is one or more metals including silicon, such that when cycled in the electrochemical cell with a non-aqueous electrolyte and a positive electrode, the voltage of the electrochemical cell is controlled such that the potential of the lithiated intermetallic negative electrode at the top of charge is less than 0.2 V but greater than 0 V vs. metallic lithium.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A method of operating an electrochemical cell through a plurality of charge-discharge cycles, said electrochemical cell including an intermetallic negative electrode of $Cu_{6-x}M_xSn_5$, wherein x is $\leq3$ and M is one or more metals including Si and a positive electrode containing Li in which said electrochemical cell Li is shuttled between the positive electrode and the negative electrode during charge and discharge to form a lithiated intermetallic negative electrode during charge comprising the step of controlling the voltage of the electrochemical cell during the charge portion of the charge-discharge cycles so that the potential of the lithiated intermetallic negative electrode in the fully charged electrochemical cell is less than 0.2 V but greater than 0 V versus metallic lithium.

2. The method of claim 1, wherein x is $\leq1$.

3. The method of claim 1, wherein M is one or more of a transition metal or Si or Li.

4. The method of claim 1, wherein M is one or more of Mn, Fe, Zn and Ni.

5. The method of claim 1, wherein the ratio of Cu and M atoms to Sn atoms in the negative electrode $Cu_{6-x}M_xSn_5$ structure is between about 1.5:1 and 1.0:1 when the cell is fully charged.

6. The method of claim 1, wherein the negative electrode contains greater than stoichiometric quantities of Cu and M.

7. The method of claim 6, wherein either or both of Cu and M are present in amounts greater than stoichiometric up to about 10% by weight.

8. The method of claim 1, wherein the negative electrode contains a grain growth inhibitor.

9. The method of claim 8, wherein the grain growth inhibitor is carbon or graphite present as a powder.

10. The method of claim 1, wherein the Cu and M atoms in the negative electrode are at least partially disordered.

11. The method of claim 1, wherein the negative electrode includes a substrate of M as a current collector.

12. The method of claim 11, wherein the substrate is laminated to the electrode.

13. The method of claim 11, wherein the current collector is Cu or Ni.

14. The method of claim 1, wherein the potential of the lithiated negative electrode is maintained above 0 V by controlling the installed capacity of the positive electrode.

15. The method of claim 1, wherein a microprocessor is connected between the positive and negative electrodes to control the voltage of the cell.

16. A method of operating an electrochemical cell through a plurality of charge-discharge cycles, said electrochemical cell including an intermetallic negative electrode of $Cu_{6-x}M_xSn_5$, wherein x is $\leq3$ and M is one or more metals including Si and a non-aqueous electrolyte and a positive electrode containing Li from a source thereof from one or more of $LiCoO_2$, $LiNiO_2$, $LiMnO_2$, $LiMn_2O_4$, $LiFePO_4$ or derivatives thereof in which said electrochemical cell Li is shuttled between the positive electrode and the negative electrode during charge and discharge to form a lithiated intermetallic negative electrode during charge, comprising the step controlling the voltage of the electrochemical cell during the charge portion of the charge-discharge cycles so that the potential of the lithiated intermetallic negative electrode in the fully charged electrochemical cell is less than 0.2 V but greater than 0 V versus metallic lithium.

17. The method of claim 16, wherein the potential of the negative electrode is maintained between about 1.5 V and 0.01 V vs. metallic lithium.

18. The method of claim 17, wherein the potential of the negative electrode is maintained between about 1.2 V and 0.01 V vs. metallic lithium.

19. The method of claim 17, wherein the negative electrode is made with up to about 10% by weight more than stoichiometric amounts of Cu and M present as powder.

20. The method of claim 19, wherein the lithiated negative electrode has a disordered or partially disordered zinc-blende-type structure.

* * * * *

UNITED STATES PATENT AND TRADEMARK OFFICE
CERTIFICATE OF CORRECTION

PATENT NO. : 6,730,429 B2
DATED : May 4, 2004
INVENTOR(S) : Michael M. Thackeray et al.

It is certified that error appears in the above-identified patent and that said Letters Patent is hereby corrected as shown below:

Title page,
Item [57], ABSTRACT,

Line 3, delete " $\genfrac{}{}{0pt}{}{<}{=}$ " and insert -- $\leq$ --.

Column 1,
Lines 22 and 51, delete " $\genfrac{}{}{0pt}{}{<}{=}$ " and insert -- $\leq$ --.

Column 10,
Lines 19, 30 and 65, delete " $\genfrac{}{}{0pt}{}{<}{=}$ " and insert -- $\leq$ --.

Signed and Sealed this

Seventh Day of December, 2004

JON W. DUDAS
*Director of the United States Patent and Trademark Office*